United States Patent
Rezaei et al.

(10) Patent No.: US 11,702,564 B2
(45) Date of Patent: Jul. 18, 2023

(54) COATING COMPOSITIONS AND METHODS FOR USING THE SAME

(71) Applicants: Fateme Rezaei, Rolla, MO (US); Thomas P. Schuman, Rolla, MO (US); Glenn C. Morrison, Chapel Hill, NC (US)

(72) Inventors: Fateme Rezaei, Rolla, MO (US); Thomas P. Schuman, Rolla, MO (US); Glenn C. Morrison, Chapel Hill, NC (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 123 days.

(21) Appl. No.: 16/931,694

(22) Filed: Jul. 17, 2020

(65) Prior Publication Data
US 2021/0017419 A1 Jan. 21, 2021

Related U.S. Application Data

(60) Provisional application No. 62/875,225, filed on Jul. 17, 2019.

(51) Int. Cl.
*C08K 3/36* (2006.01)
*C09D 179/02* (2006.01)

(52) U.S. Cl.
CPC .............. *C09D 179/02* (2013.01); *C08K 3/36* (2013.01); *C08K 2201/011* (2013.01)

(58) Field of Classification Search
CPC ...... C08K 3/36; C08K 2201/011; C08K 9/08; C09D 179/02; B01J 20/2803; B01J 20/3204; B01J 20/327
USPC ....................................................... 523/218
See application file for complete search history.

(56) References Cited

U.S. PATENT DOCUMENTS

2010/0189993 A1* 7/2010 Mori ........................ C08J 7/05
428/317.5

OTHER PUBLICATIONS

Drese et al. ("Synthesis-Structure-Property Relationships for Hyperbranched Aminosilica CO2 Adsorbents", Advanced Functional Materials, vol. 19, Issue 23 (Year: 2009).*
Bierwagen, G., P., and Rich, D., C., "The Critical Pigment Volume Concentration in Latex Coatings", Progress in Organic Coatings, vol. 11, No. 4, pp. 339-352 (1983).
Cheng, H., H., and Tan, C., S., "Removal of CO2 from indoor air by alkanolamine in a rotating packed bed", Separation and Purification Technology, Elsevier, vol. 82, No. 1, pp. 156-166 (2011).
Choi, S., et al., "Amine-Tethered Solid Adsorbents Coupling High Adsorption Capacity and Regenerability for CO2 Capture From Ambient Air", ChemSusChem, vol. 4, No. 5, pp. 628-635 (2011).
Didas, S., A., et al., "Role of Amine Structure on Carbon Dioxide Adsorption from Ultradilute Gas Streams such as Ambient Air", ChemSusChem, vol. 5, pp. 2058-2064 (2012).
Drese, J., H., "The Design, Synthesis, and Characterization of Aminosilica Adsorbents for CO2 Capture From Dilute Sources", A Thesis Presented to The Academic Faculty, Georgia Institute of Technology, pp. 1-245 (Dec. 2010).
Gebald, C., et al., "Single-Component and Binary CO2 and H2O Adsorption of Amine-Functionalized Cellulose", Environmental Science & Technology, vol. 48, pp. 2497-2504 (2014).
Heydari-Gorji, A., et al., "Polyethylenimine-Impregnated Mesoporous Silica: Effect of Amine Loading and Surface Alkyl Chains on CO2 Adsorption", Langmuir, American Chemical Society, vol. 27, No. 20, pp. 12411-12416 (Oct. 18, 2011).
Jeon, D., H., et al., "Preparation And Characterization Of Chemically Activated Carbon Materials For CO2 Capture", Carbon Letters, vol. 17, No. 1, pp. 85-89 (2016).
Kishor, R., and Ghoshal, A., K., "Amine-Modified Mesoporous Silica for CO2 Adsorption: The Role of Structural Parameters", Industrial & Engineering Chemistry Research, vol. 56, No. 20, pp. 6078-6087 (2017).
Kumar, A., et al., "Direct Air Capture of CO2 by Physisorbent Materials", Wiley-VCH Verlag GmbH & Co., Angewandte Communications. Chem. Int. Ed., vol. 54, pp. 14372-14377 (2015).
Kuwahara, Y., et al., "Enhanced CO2 Adsorption over Polymeric Amines Supported on Heteroatom-Incorporated SBA-15 Silica: Impact of Heteroatom Type and Loading on Sorbent Structure and Adsorption Performance", Chemistry A European Journal, vol. 18, No. 52, pp. 16649-16664 (2012).
Linneen, N., N., et al., "Amine Distribution and Carbon Dioxide Sorption Performance of Amine Coated Silica Aerogel Sorbents: Effect of Synthesis Methods", Industrial & Engineering Chemistry Research, vol. 52, No. 41, pp. 14671-14679 (2013).
Liu, S., H., et al., "Adsorption of CO2 from Flue Gas Streams by a Highly Efficient and Stable Aminosilica Adsorbent", Air & Waste Management Association, vol. 61, Issue. 2, pp. 226-233 (Feb. 2011).
Nomura, A., and Jones, C., W., "Amine-Functionalized Porous Silicas as Adsorbents for Aldehyde Abatement", ACS Applied Materials & Interfaces, vol. 5, pp. 5569-5577 (2013).
Qi, G., et al., "High Efficiency Nanocomposite Sorbents For CO2 Capture Based On Amine-Functionalized Mesoporous Capsules", Energy & Environmental Science, vol. 4, pp. 444-452 (2011).
Rajan, P., E., et al., "Advanced Buffer Materials For Indoor Air CO2 Control In Commercial Buildings", Indoor Air, pp. 1-31 (Apr. 2017).
Rezaei, F., and Jones, C., W., "Stability of Supported Amine Adsorbents to SO2 and NOx in Postcombustion CO2 Capture", Industrial & Engineering Chemistry Research, vol. 52, No. 34, pp. 12192-12201 (2013).

(Continued)

*Primary Examiner* — Hannah J Pak
(74) *Attorney, Agent, or Firm* — Shook, Hardy & Bacon, L.L.P.

(57) ABSTRACT

Coating compositions and methods for using the same are disclosed. The coating compositions can include an aminosilica adsorbent. The coating compositions can adsorb $CO_2$.

9 Claims, 25 Drawing Sheets
(1 of 25 Drawing Sheet(s) Filed in Color)

(56) References Cited

OTHER PUBLICATIONS

Shen, X., et al., "Polyethylenimine Applications in Carbon Dioxide Capture and Separation: From Theoretical Study to Experimental Work", Energy Technology, vol. 5, pp. 822-833 (2017).
Thakkar, H., et al., "Formulation of Aminosilica Adsorbents into 3D-Printed Monoliths and Evaluation of Their CO2 Capture Performance", ACS Applied Materials & Interfaces, vol. 9, pp. 7489-7498 (Feb. 2017).

\* cited by examiner

COATING COMPOSITIONS AND METHODS FOR USING THE SAME

CROSS-REFERENCE TO RELATED APPLICATIONS

This application claims priority to U.S. Provisional Application Ser. No. 62/875,225, filed on Jul. 17, 2019, the entire contents of which are incorporated by reference herein.

TECHNICAL FIELD

The present disclosure relates to compositions and methods for using the same. More particularly, the present disclosure relates to compositions and methods for using the same, where the compositions may adsorb $CO_2$.

BACKGROUND $CO_2$ levels in the indoor environment are an important factor in assessing the safety and viability of a commercial building. The American Society of Heating, Refrigerating and Air-Conditioning Engineers (ASHRAE) states that acceptable indoor $CO_2$ levels can be above 500-700 ppm of outdoor concentrations to facilitate a comfortable environment. Installing and maintaining ventilation systems (e.g., HVAC systems) may be used, in certain current systems, to control $CO_2$ accumulation in accordance with ASHRAE standards. However, as $CO_2$ does not typically reach a steady state concentration in an indoor environment, it may be difficult to determine a ventilation rate that would be adequate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative aspects of the present invention are described in detail below with reference to the attached drawing figures, which are incorporated by reference herein and wherein.

DESCRIPTION

Overview

Figure 1:
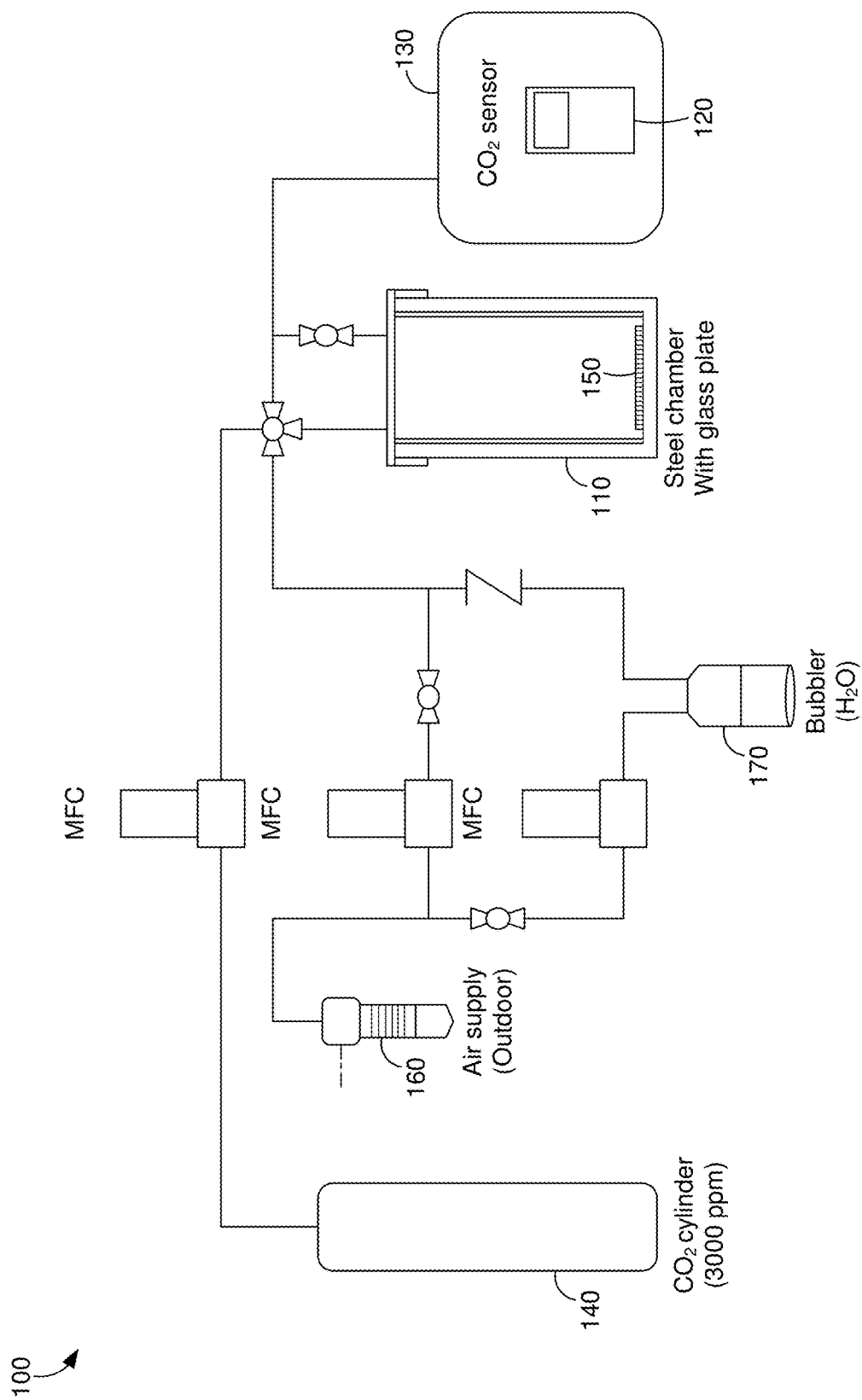
FIG. 1 is a schematic representation of a system to utilize in a $CO_2$ Adsorption Chamber Test, in accordance with aspects hereof.

The disclosure herein relates to coating compositions. In aspects, the coating compositions can include an aminosilica adsorbent and a latex mixture. In the same or alternative aspects, the coating compositions disclosed herein can adsorb $CO_2$. In aspects, the coating compositions disclosed herein are in liquid form when utilized to coat a surface.

As discussed above, $CO_2$ levels in the indoor environment are an important factor in assessing the safety and viability of a commercial building. The American Society of Heating, Refrigerating and Air-Conditioning Engineers (ASHRAE) states that acceptable indoor $CO_2$ levels can be above ~500-700 ppm of outdoor concentrations to facilitate a comfortable environment. In the U.S., the indoor $CO_2$ concentration in an office environment may be anywhere between 100-200 ppm above outdoor values (~400 ppm) in the presence of good ventilation. Higher levels of $CO_2$ may be found in offices and schools, sometimes as high as 1500 ppm. Without adequate ventilation, $CO_2$ may accumulate and lead to a number of negative health effects such as nasal congestion to nausea and headaches and have been found to have profound effects on the performance of the workforce. Exhalation from human sources have been found to be one of the primary causes of $CO_2$ bid up in an enclosed environment, with a $CO_2$ generation rate of around 37 g/h per person.

Installing and maintaining ventilation systems (e.g., HVAC systems) is presently used, in certain scenarios, to control $CO_2$ accumulation in accordance with ASHRAE standards. However, as $CO_2$ does not typically reach a steady state concentration in an indoor environment, it may be difficult to determine a ventilation rate that would be adequate. In certain other systems, solid sorbents, such as metal oxides, have been utilized to test $CO_2$ adsorption from atmospheric air. In yet other systems, a photocatalytic film was utilized to sequester $CO_2$, but this system relied on the conversion of $CO_2$ to non-$CO_2$ based products and was not a passive control method. Further, while certain other systems have been utilized to adsorb $CO_2$ in certain environments, such systems did not incorporate the $CO_2$-absorbing materials into latex paints, nor were these systems sufficient for effective control of $CO_2$ in indoor air. There is a need for more efficient compositions and methods for reducing indoor air $CO_2$ concentration and improving indoor air quality without increasing the air exchange ventilation rates.

Accordingly, in one aspect, a composition is provided that includes an aminosilica adsorbent and a latex mixture.

In another aspect, a composition is provided that includes an aminosilica adsorbent and a latex mixture. In such an aspect, the latex mixture includes one or more polymeric binders. Further in such an aspect, the aminosilica adsorbent is present at a volume that is within 20% of a volume of the one or more polymeric binders.

In another aspect, a method of passively controlling $CO_2$ in an enclosed environment is provided. The method can include applying to a surface in the enclosed environment an aminosilica-containing coating composition. In such an aspect, the aminosilica-containing coating composition can include an aminosilica adsorbent and a latex mixture, where the latex mixture includes one or more polymeric binders. Further, in such an aspect, the aminosilica adsorbent is present at a volume that is within 20% of a volume of the one or more polymeric binders. Yet further, in such an aspect, the coating composition exhibits an adsorption capacity of from 0.2 mmol/g at 800 ppm of $CO_2$ and 15% relative humidity to 1.5 mmol/g at 800 ppm of $CO_2$ and 15% relative humidity, as determined according to the $CO_2$ Adsorption Chamber Test.

In aspects, compositions and/or paint compositions are disclosed that include sorbent particles that may be used as pigments. In aspects, the compositions and/or paint compositions disclosed herein can be utilized in enclosed spaces. In such aspects, where the compositions and/or paint compositions are utilized, e.g., applied to a surface in an enclosed space, such compositions may thereby passively capture pollutants and/or improve the indoor air quality while reducing ventilation rates. One aspect of the preparation of the paints and compositions disclosed herein involves the concept of a critical pigment volume concentration ("CPVC"). The CPVC of a paint is defined as the ratio of the volume of non-volatiles in the paint with respect to the total volume of the paint mixture, including the binder and is a factor to consider when evaluating the nature and performance of coatings and paints. At this threshold value, the volume of the pigment is approximately quantitatively equal to the volume of the binder, in aspects. In aspects, the volume of pigment at or near the CPVC level in a paint may imply that the pigment used is substantially completely in contact with the binder. Further, paints that include pigment at or near this CPVC value may exhibit various properties that may be advantageous, such as a high porosity and/or a larger retention of the useable surface area of the pigment used. The exploration of this factor in the development of porous coatings for potential pollutant capture has not been previously evaluated. Using a paint formulation at such high PVC (pigment volume concentration) levels presents challenges such as brittleness and flaking. Furthermore, application of such paints may result in a relatively non-uniform coating, in that due to the high viscosity of the paint, the bristles of the applicator brush may leave spaces on the coating surface. In regular paint applications, the PVC is kept very low so as to produce a paint to overcome such problems. Low PVC paints, however, tend to have a lower pigment concentration, which would result in a lower $CO_2$ adsorption efficiency. In aspects, the coating compositions disclosed herein may include a high PVC value and exhibit minimal brittleness and flaking.

In aspects, the coating compositions disclosed herein can exhibit an adsorption capacity of from 0.2 mmol/g at 800 ppm of $CO_2$ and 15% relative humidity to 1.5 mmol/g at 800 ppm of $CO_2$ and 15% relative humidity, as determined according to the $CO_2$ Adsorption Chamber Test described herein. In certain aspects, the coating compositions can exhibit an adsorption capacity from 0.5 mmol/g at 800 ppm of $CO_2$ and 15% relative humidity to 1.5 mmol/g at 800 ppm of $CO_2$ and 15% relative humidity, as determined according to the $CO_2$ Adsorption Chamber Test.

As discussed above, in various aspects the compositions and/or coating compositions disclosed herein can comprise one or more sorbents, e.g., one or more sorbent particles to yield a porous paint with a relatively high surface area. In such aspects, the compositions disclosed herein may be utilized for application in smart buildings to reduce ventilation rates and improve indoor air quality by facilitating the adsorption and desorption of $CO_2$.

In such aspects, the sorbents may be used as pigments in the compositions or paint compositions. In various aspects, the one or more sorbents can include one or more aminosilica adsorbents. In certain aspects, the aminosilica adsorbent may include one or more aminopolymers. In various aspects, the aminosilica adsorbent may be formed or synthesized from one or more types of aminopolymers. In the same or alternative aspects, the aminosilica adsorbent may include a mesoporous silica support and one or more types of aminopolymers. As used herein, the term "mesoporous" refers to a material having one or more pores with a diameter between about 2 nanometers and about 50 nanometers. In aspects, a pore having a size characterized by a specific diameter or range of diameters may not be circular or spherical in shape, and can instead refer to a pore of such a shape and size so that a sphere having the specified diameter is able to insert or pass though such a pore.

In aspects, the mesoporous silica support, prior to being functionalized, e.g., with one or more aminopolymers, can exhibit a specific surface area ($S_{BET}$) from about 100 m$^2$/g to about 500 m$^2$/g, from about 150 m$^2$/g to about 450 m$^2$/g, from about 250 m$^2$/g to about 350 m$^2$/g, or about 294 m$^2$/g. In aspects, the mesoporous silica support, prior to being functionalized, e.g., with one or more aminopolymers, can exhibit a pore volume ($V_p$) from about 0.6 cm$^3$/g to about 1.4 cm$^3$/g, from about 0.7 cm$^3$/g to about 1.3 cm$^3$/g, from about 0.9 cm$^3$/g to about 1.1 cm$^3$/g, or about 1.04 cm$^3$/g. In aspects, the mesoporous silica support, prior to being functionalized, e.g., with one or more aminopolymers, can exhibit a pore diameter ($d_p$) from about 9 nanometers (nm) to about 11.2 nm, from about 9.2 nm to about 11.0 nm, from about 9.5 nm to about 10.5 nm, or about 10.1 nm.

In various aspects, the aminopolymers can include tetraethylenepentamine (TEPA), polyethylenimine (PEI), or a combination thereof. In certain aspects, an aminosilica adsorbent comprising a silica support, e.g., a mesoporous silica support, and TEPA, is referred to herein as silica-TEPA. In the same or alternative aspects, an aminosilica adsorbent comprising a silica support, e.g., a mesoporous silica support, and PEI, is referred to herein as silica-PEI.

As discussed above, in various aspects, the coating compositions disclosed herein can include or incorporate one or more aminosilica adsorbents mentioned above with various amine content as pigments into a paint formulation. In such aspects, the paint formulation and/or coating compositions can include a binder, e.g., a polymeric binder, in addition to one or more aminosilica adsorbents. In various aspects, the coating compositions disclosed herein may include or incorporate silica-PEI and/or silica-TEPA with various amine content as pigments in addition to one or more binders, e.g., a polymeric binder.

In aspects, the coating compositions can have a latex content of from 15 wt. % to 60 wt. % (wt. % of the applied coated composition film in its dry state). In the same or alternative aspects, the coating compositions can have an aminosilica content of from 40 wt. % to 85 wt. % (wt. % of the applied coated composition film in its dry state).

As discussed above, in aspects, the coating compositions disclosed herein can include an adsorbent, e.g., as a pigment, where such adsorbent and/or pigment is present in the coating compositions at or near the CPVC level. In one aspect, in a coating composition, an adsorbent, e.g., an aminosilica adsorbent, can be present at a volume that is within 20% (within 15%, within 10%, or within 5%) of a volume of the one or more binders, e.g., polymeric binder, on a volume/volume basis in the coating composition.

In aspects, the polymeric binder can include one or more polymers capable of maintaining flexibility to prevent embrittlement at high pigment concentrations, e.g., at or near CPVC. In such aspects, the polymeric binder can exhibit a glass transition temperature of about 20° C., or below 20° C. In such aspects, the glass transition temperature can be measured according to ASTM D3418. In various aspects, the polymeric binder can include one or more polymers having suitable rheological properties to increase the cohesion of the pigments to the latex.

In certain aspects, the polymeric binder can comprise a polyacrylic-based binder. In various aspects, the polymeric binder can include an acrylic copolymer. In the same or alternative aspects, the polymeric binder can include an acrylic copolymer comprising butyl acrylate. In aspects, the polymeric binder can include an acrylic copolymer high in butyl acrylate.

In various aspects, in the absence of continuous phase binder to absorb mechanical stress, the film should have a capability to respond to mechanical deformation in a non-destructive way. In certain aspects, having a polymer comprised of low glass transition temperature monomers, such that the glass transition temperature of the entire polymer or, for segregated compositions, its continuous phase, is below ambient temperature, is needed to allow the film to readily flex via elastic plus plastic flow mechanisms. In such aspects, for lower temperature environments that can mean having glass transition temperatures significantly below a 'normal' room temperature of about 22° C. (295K) and these glass transition temperatures can be readily achieved using butyl acrylate or sec-butylacrylate comonomers of homopolymer glass transition temperatures of −53° C. (220K) and −26° C. (247K), respectively, for example. In such aspects, the ultimate amounts of butylacrylate comonomer(s), or other low glass transition temperature comonomer, is dependent on the hompolymer glass transition temperatures of remaining comonomers, i.e., as may be estimated using the Flory-Fox equation, and the microstructure of the copolymer such as that resulting from phase segregation. In certain aspects, the high molecular weight polymers may then at least partly form a rubbery phase that can adhere well to the adsorbent particles, allow particle film relaxation against mechanical stress, and permit a particle concentration that retains a mostly open porous framework to maximize internal surface area and exposure of particle surfaces to gases being adsorbed. In certain aspects, the rubbery polymer could utilize small amounts of crosslinker, such as methylene-bis-acrylamide or divinyl benzene, to provide a minimal shape memory but should not be used in amounts to prevent polymer solubility by gel formation.

In aspects, the latex mixture can include, but is not limited to, a polymeric binder, such as one or more of the polymeric binders discussed above, a dispersant, water, propylene glycol, a defoamer, a film former, a thickener, a preservative, or a combination thereof.

In aspects, an example coating composition may include: about 15 wt. % to about 55 wt. % binder, about 25 wt. % to about 60 wt. % adsorbent; about 10 wt. % to about 55 wt. % water, and about 0.5 wt. % to about 25 wt. % additives (that may include but are not limited to a dispersant, a defoamer, a film former, a thickener, a preservative, or a combination thereof). In the same or alternative aspects, the example coating compositions may include about 10 wt. % to about 60 wt. % aminopolymers, where such aminopolymers were loaded or utilized to functionalize the adsorbent, e.g., porous silica, as discussed herein.

In certain aspects, the coating compositions may present in a liquid state including in a suspension or a dispersion. In aspects, the coating compositions can be applied to a surface by a brush, roller, sprayer, or other convenient paint application tools. In various aspects, the coating compositions are not in powder form when applied to a surface. In certain aspects, once the coating compositions have been applied to a surface and dried, a film of the coating composition may form. In such aspects, the film of the coating composition may be porous as described herein.

In various aspects, the coating compositions can be utilized as passive control of $CO_2$ in an environment. In aspects, the coating compositions can be utilized as passive control of $CO_2$ in an enclosed environment. In various aspects, the coating compositions disclosed herein may be applied to one or more surfaces in an enclosed environment for passive control of $CO_2$.

This invention and aspects of the compositions and methods disclosed herein may be further understood by reference to the following non-limiting examples.

EXAMPLES

Property Analysis and Characterization Procedures $CO_2$ Adsorption Chamber Test. The $CO_2$ adsorption characteristics of the prepared materials can be investigated using a set-up, as depicted in FIG. 1. The system 100 includes a small 10 L stainless-steel chamber 110 connected to a $CO_2$ analyzer or sensor 120 (AEMC instruments, Indoor Air Quality meter 1510) at the outlet, which is to be placed inside an insulated environment 130 to maintain operating conditions. The required concentration of $CO_2$ is to be supplied at 90 mL/min, e.g., from a $CO_2$ cylinder 140. $CO_2$ concentrations in the inlet are to be maintained at 800 and 3000 ppm respectively, to evaluate low and high levels of $CO_2$ contamination in the indoor environment. The air flow is to be supplied to dilute and achieve the required concentrations and to be maintained at 400 mL/min. The air flow is to be used in both conditions to simulate ventilation and the effect of outdoor $CO_2$ concentrations on Indoor Air Quality. A 4.5 inch circular glass sheet 150 is to be placed within the chamber 110 on which the paint is to be applied. The lining of this chamber is covered in Teflon sheets to eliminate any wall interactions, to simulate indoor conditions. Before each run, a bypass is to be performed to determine the inlet concentration of $CO_2$ from ambient air. The concentration is to be allowed to equilibrate for one hour before the flow rate is turned off to stabilize $CO_2$ concentrations at the indoor environment for a further hour. This is done to obtain fairly stable levels of outdoor $CO_2$ and to apply some significance to the experiment, as regular working hours occur around this time. Outdoor $CO_2$ levels, via an air supply 160, were recorded to be between 425-435 ppm. The elevation in $CO_2$ concentration level as compared to measured ambient concentrations may be attributed to increased pollution levels present at that time of the day. Due to relative humidity (RH) being an influential parameter in the adsorption of pollutants onto amines along with being a fundamental parameter in the determination of indoor air quality solutions, a saturator or bubbler 170 containing distilled water was supplied as the source of relative humidity into the chamber 110 using the ambient air as the carrier gas. High and low levels of RH are to be studied at 15% and 50%, respectively.

Figure 2:
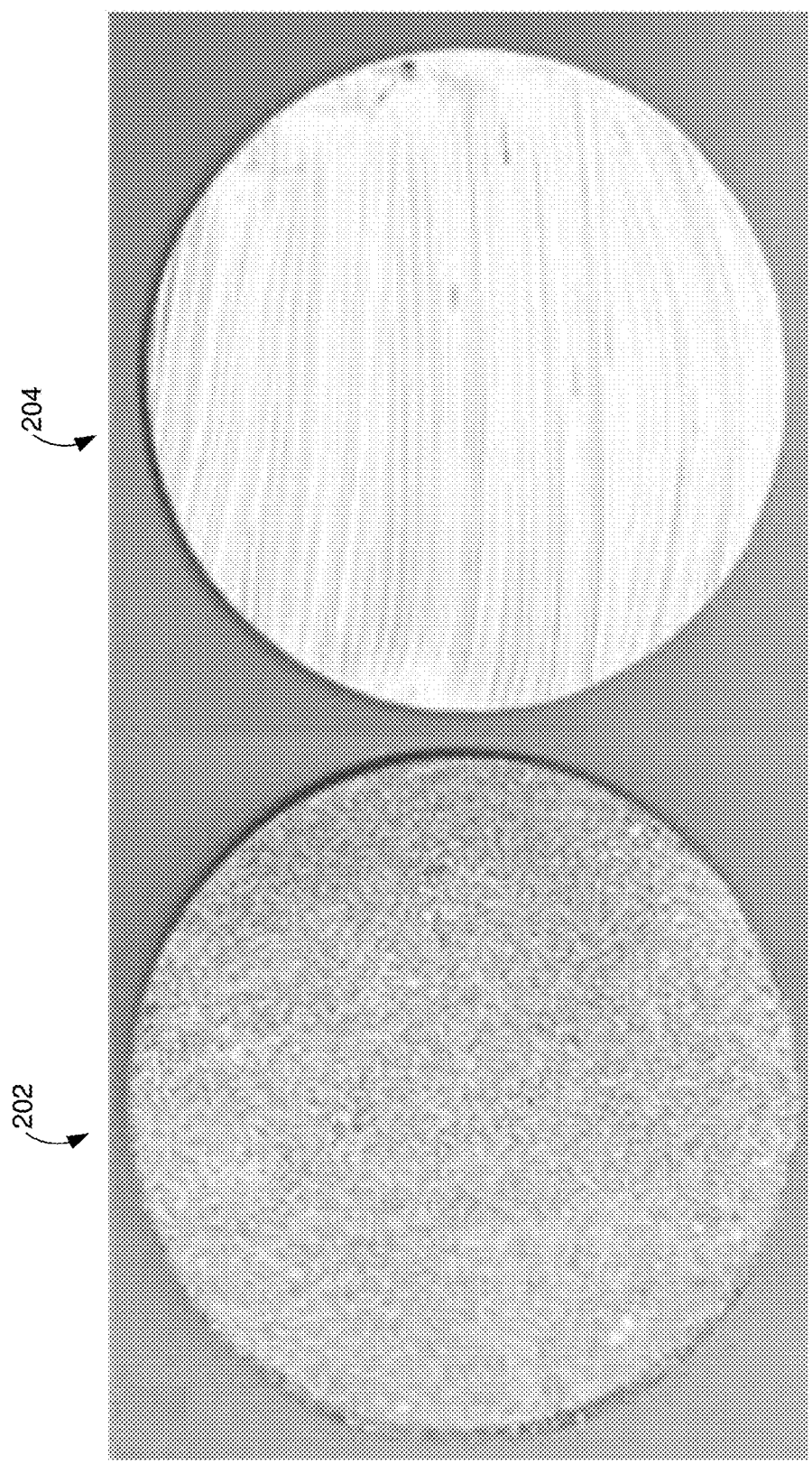
FIG. 2 is an image of an aminosilica powder-based adsorbent on a glass surface and an image of an example coating composition spread on a glass surface, in accordance with aspects hereof.

A test powder-based adsorbent is to be sprinkled onto the glass sheet using a sieve, as illustrated by FIG. 2, panel 202. A fairly even distribution of the adsorbent along the surface of the glass sheet should be obtained to accurately examine $CO_2$ capture efficiency and to compare it with its corresponding paint, e.g., a composition comprising the adsorbent. Similarly, the paints are to be coated onto the glass sheets using a brush. The weight of the paint on the glass sheet is to be kept constant in its wet state. This results in fairly consistent fin weights in the dry state. Due to the high viscosity of the paint, the standard procedure of settling of the film does not occur, and bristle marks across the area of the glass sheet may appear, as shown in FIG. 2, panel 204. The bristle marks may be a consequence of using a high PVC level paint, and may be present in all test or example paints to be coated for testing. The weight of the aminosilica adsorbent is to be maintained at 0.4 g corresponding to 2.0 g of latex coating.

$CO_2$ adsorption capacity is to be calculated using eq. 1:

$$q_d = \frac{Q_{CO_2} C_{CO_2} t_{ads}}{22.4 W_{ads}} \quad (1)$$

where $q_d$ is the adsorption capacity (mmol/g), $Q_{CO_2}$ is the inlet flow rate of $CO_2$ (mL/min), $C_{CO_2}$ is the inlet concentration of $CO_2$ (ppm), $t_{ads}$ is the time required for adsorption (min) and $W_{ads}$ is the weight of adsorbent used in the experiment. In case of the paint samples, the weight of the film is to be used in estimation of $q_d$.

Oil Adsorption Test. Oil adsorption (OA) may be used as a parameter to calculate the CPVC of the prepared paints using the standard ASTM D281 method. The oil absorption tests are to be performed using a 50 mL burette filled with the binder/emulsion. A large glass sheet is to be placed under the burette loaded with the adsorbent under investigation. The binder is to be allowed to contact the adsorbent dropwise. The adsorbent and binder are to then be thoroughly mixed until a waxy substance is obtained, indicating the saturation of the binder in the adsorbent. The volume of oil absorbed onto the adsorbent, $V_{oil}$ is to be recorded and used in eq. 2. The steps are then to be repeated multiple times to get an average value. The total time of the experiment is also to be kept constant at about 20 min.

$$OA = \frac{(OA^f \times V_{oil})}{W_P} \quad (2)$$

The oil absorption value is to be calculated using eq. 2, where OA is the oil absorption capacity (mL), $OA^f$ is the oil factor (100 g), $V_{oil}$ is the volume of oil absorbed from the burette (mL) and $W_P$ is the weight of the pigment selected (g). The critical pigment volume concentration is to be calculated using eq. 3.

$$CPVC = \frac{1}{1 + \frac{(OA)\rho_P}{(100 \times \rho_B)}} \times 100 \quad (3)$$

In eq. 3, $\rho_P$ is the density of the pigment (g/cm$^3$) and $\rho_B$ is the density of the binder used for the test (g/cm$^3$).

Example 1: Preparation of Example Coating Compositions

Preparation of Example Aminosilica Adsorbents. The silica support used in this Example was purchased from PQ Corporation (PD-09024). AU other chemicals used in this Example were purchased from Sigma Millipore. The aminopolymers used herein were tetraethylenepentamine (TEPA) and polyethylenimine (PEI). The commercially-available silica support was functionalized by the aminopolymers using a wet impregnation method. First, the silica was degassed for 24 h at 120° C. to remove any gaseous or volatile impurities. A solution was made using a calculated amount of PEI or TEPA in methanol and was left to stir for 2 h. Hot silica was added into the above solution and was subsequently left to stir for an additional 12 h to facilitate the impregnation process. To recover the adsorbent from the solution, a rotary evaporator was used after which the impregnated silica powders were subjected to outgassing for 2 h at 80° C. The final powders obtained were named as silica-PEI and silica-TEPA, with their corresponding impregnated weight percentages. Three variations of each type of adsorbent were prepared, at three different loadings of the aminopolymer.

Preparation of Example Coating Composition that Comprises an Aminosilica Adsorbent and a Latex Mixture. The incorporation of the prepared adsorbents into a paint was achieved in three steps. Hydroxyethyl cellulose, e.g., Cellosize™ QP 4400, (0.2 wt %) was used as a thickener and was dispersed in a mixture of propylene glycol (2.9 wt %) and water (24 wt %). To maintain a basic pH, 2-amino-2-methyl-1-propanol, e.g., AMP-95@, (0.3 wt %) was added to the mixture. In next step, an industrial preservative, e.g., canguard 327, (0.2 wt %) and a nonionic surfactant, e.g., Triton™ X100, (0.2 wt %) were added while a defoamer, e.g., Byk 22, (0.28 wt %) was added shortly after. To further enhance dispersion within the latex mixture, a dispersant, e.g., Esperse® 100 (2.35 wt %) was used. The mixture was then set to disperse for 30 mins. The prepared aminosilica adsorbents were used in quantities according to calculated PVC levels. For example, calculated values of silica-PEI were added to the mixture in small amounts at 1500 rpm. Due to high PVC levels, water was added to achieve homogeneous dispersion and to avoid coagulation. The obtained latex was dispersed for a further 30 mins. An acrylic emulsion, e.g., Joncryl® 1532, (32.7 wt %) was used as an emulsion and was added to the above dispersion at 1000 rpm, with the successive addition of a film former, e.g., Ucar™ IBT, (1 wt/o). A white aminosilica slurry was obtained with a very high viscosity. This paint was then coated using a standard paint brush onto a glass sheet of 4.5 in diameter with a film thickness of 55 microns and left to dry for 48 h at 50° C. The final paints obtained were named as PEI(y)-L and TEPA(y)-L, where y refers to the mass percentage of impregnated aminopolymers on the silica support. Three variations of each type of adsorbent were prepared, at three different loading percentages of the aminopolymer. The calculated aminopolymer loading in the final prepared paints, namely, PEI20-L, PEI35-L, PEI50-L and TEPA35-L, TEPA60-L, TEPA70-L were 20, 30 and 40 wt % in the final paint formulation.

Example 2: Characterization of Example Coating Compositions from Example 1

To assess the textural properties of the coatings, $N_2$ physisorption isotherms were obtained using a Micromeritics 3Flex gas analyzer at 77 K. Degassing in a Micromeritics Prevac was performed for 1 h at 110° C. Surface area was consequently determined using Brunauer-Emmett-Teller (BET) while pore volume was estimated using the BJH desorption method, obtained from the same device. Fourier-transform infrared spectroscopy (FT-IR) measurements were measured on a Nicolet Nexus 470 optical bench to determine the functional groups in the adsorbent coatings.

Figure 3:
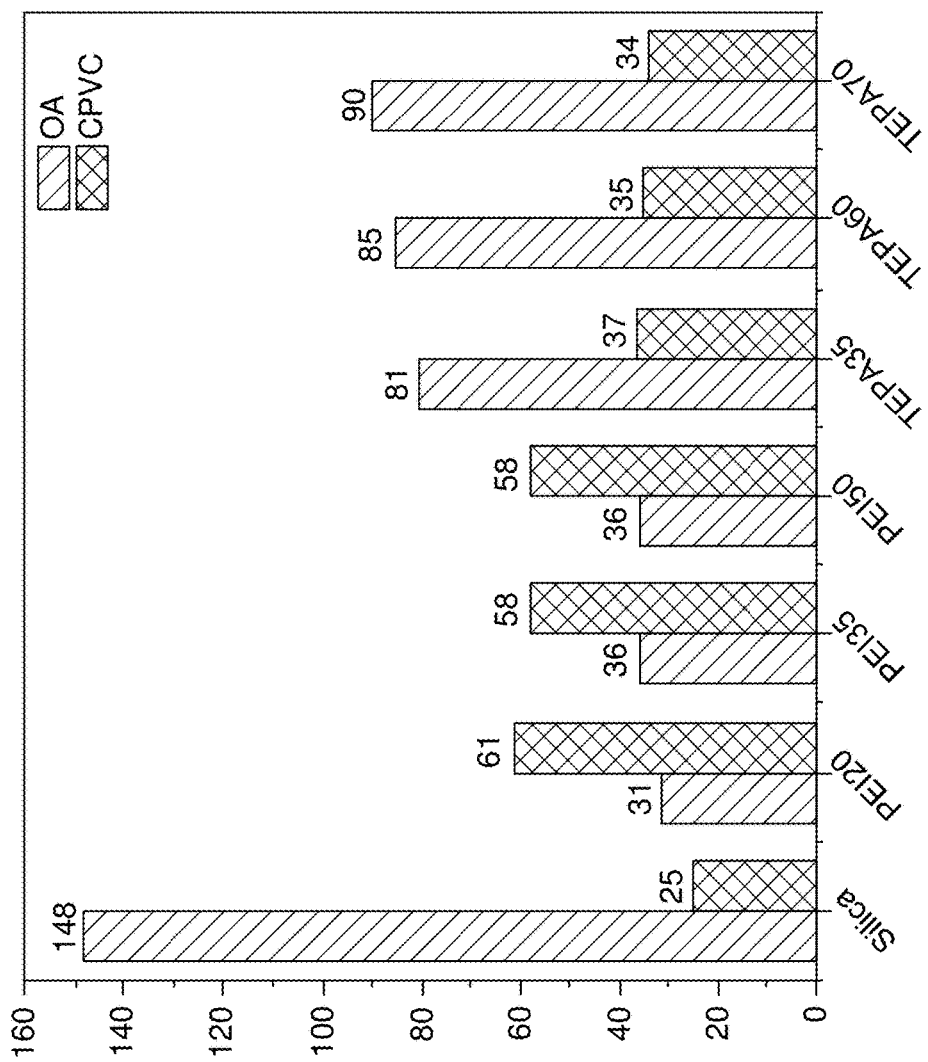
FIG. 3 is a bar graph showing the oil absorption (OA) capacity and critical pigment volume concentration (CPVC) values for various coating compositions and bare latex, in accordance with aspects hereof.

The oil absorption (OA) is an indicator of what quantity of the pigment (e.g. aminosilica particles) can be added to the paint formulation without suffering the disadvantages of a high PVC paint, which can result in flaking and brittle film formation while maintaining a high pigment volume concentration to provide porosity to the applied film. Using the OA capacity estimated from eq. 2, CPVC values of the respective paints were calculated and are summarized in FIG. 3. An inverse dependence between OA capacity and CPVC was observed, indicating the potential for larger pigment loading with lower OA values. TEPA-L samples exhibited a lower CPVC as compared to PEI-L latexes. In aspects, this could be attributed to the nature of the interaction between the binder and the pigment, as this information implies that a larger amount of pigment can be dispersed in a smaller amount of binder for PEI when compared to TEPA. Notably, in aspects, the CPVC of the paints did not vary much with the increase in aminosilica loading.

Table 1 depicts the coating properties of the paints prepared in Example 1. All paint properties were calculated in the dry state of the coating. The weight of the coating was maintained at 3 g in the wet state on application. The aminosilica content was calculated by eq. 4, where $W_{AS}$ was the weight of the aminosilica in the paint in its dry state (g) and $W_{film}$ was the weight of the coated film in its dry state (g).

$$AS(\%) = \frac{W_{AS}}{W_{film}} \times 100 \quad (1)$$

Similarly, the amine percentage present in the coatings were calculated from eq. 5.

$$A(\%) = \left(\frac{A_\% \times W_{AS}}{W_{film}}\right) \times 100 \quad (5)$$

In eq. 5, $A_\%$ represents the amine impregnation percentage (%), which was obtained from the initial material synthesis procedure. As shown, the aminosilica content was similar for each class of material. Moreover, higher leaching of the amine groups was observed in the case of silica-TEPA when compared to silica-PEI, thus, the initial amount of TEPA used for impregnation was higher than that for PEI. In aspects, this could be due to the greater bonding achieved by the branched PEI with a larger number of amine groups (8) when compared to the TEPA (5). This suggested a greater degree of interaction between the binder and the aminosilica pigment in the case of PEI, which was reflective of its lower OA capacity and subsequently, higher CPVC, in aspects.

TABLE 1

Properties of example coated films.

| Sample | Weight of dry film (g) | Aminosilica content (wt %) | Amine content (wt %) | Latex content (wt %) |
|---|---|---|---|---|
| PEI20-L | 0.39 | 76.9 | 19 | 23.1 |
| PEI35-L | 0.40 | 77.2 | 27 | 22.8 |
| PEI50-L | 0.40 | 77.6 | 40 | 22.4 |
| TEPA35-L | 0.39 | 51.3 | 17 | 49.7 |
| TEPA60-L | 0.41 | 51.6 | 29 | 49.4 |
| TEPA70-L | 0.40 | 51.7 | 39 | 49.3 |

Figure 4A:
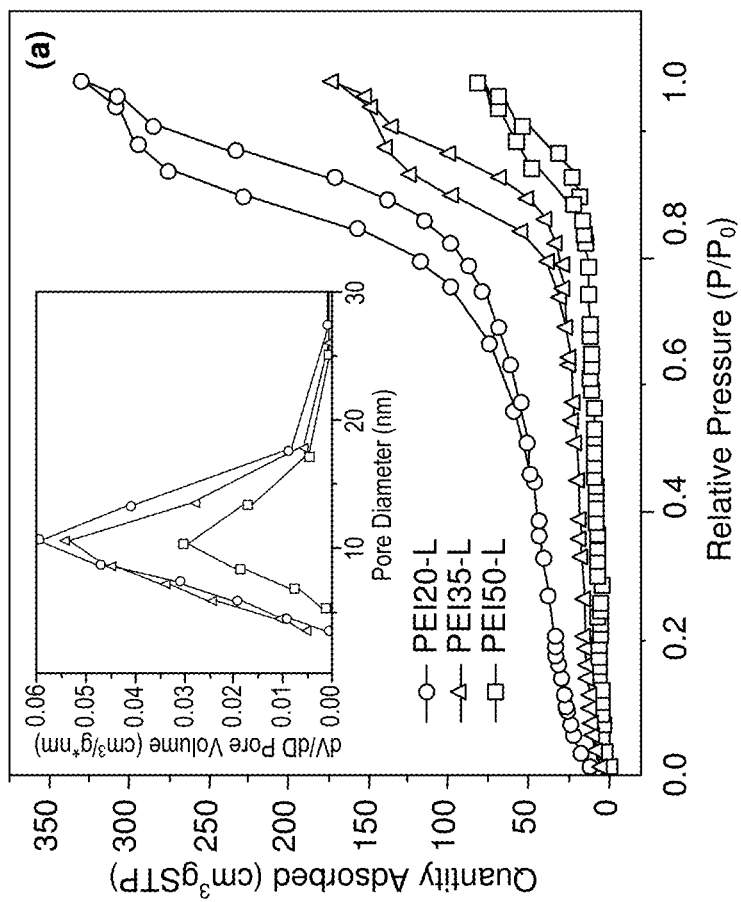
FIGS. 4A and 4B are graphs depicting $N_2$ physorption isotherms and pore size distribution profiles of example coating compositions, in accordance with aspects hereof.
Figure 4B:
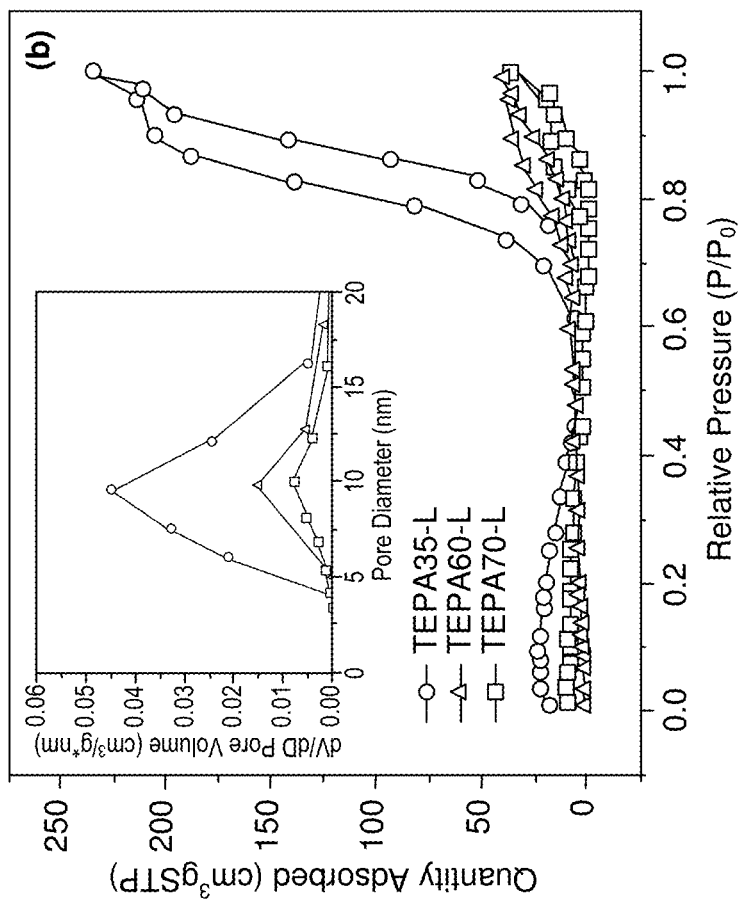

The $N_2$ physorption isotherms and pore size distribution profiles of the aminosilica-incorporated latex coatings are displayed in FIGS. 4A and 4B. The results indicated a type IV shape, with a hysterisis loop ranging from $P/P_0=0.5-0.9$, which illustrated the uniformity of the mesopores in the paints and mesoporus nature of the coatings. Notably, the $N_2$ uptakes over coating samples were comparable to those of corresponding aminosilica adsorbents suggesting a retention of surface characteristics after latex incorporation. Furthermore, in agreement with the powder analogues, $N_2$ uptake decreased upon increasing amine content for both PEI and TEPA-based latex coatings.

On comparison with the powder sorbents, the average pore diameter of the paints was shown to decrease, in aspects. In such aspects, this could be explained by the interference of latex particles within the pore system of the sorbents. Keeping PVC levels above CPVC, the interference of heavier, non-porous components such as the binder was kept to a minimum, while the relatively porous pigment material suffered only a small decrease in pore volumes, in aspects. The corresponding textural properties of the latex adsorbents presented in Table 2 revealed a decreasing trend in pore volume and surface area with amine content, in accordance with the powder samples. Also, minimal loss in surface characteristics of the latex paints was observed in comparison to the powders, indicating the successful incorporation of the powder based sorbents into the latex formulation. TEPA70-L, the highest aminopolymer loading paint exhibited a $S_{BET}$ of 24 m$^2$/g and a $V_P$ of 0.10 cm$^3$/g which was a drastic decrease from TEPA35-L, with an $S_{BET}$ of 123 m$^2$/g and 0.50 cm$^3$/g.

TABLE 2

Surface characteristics of example coatings.

| Sample | $S_{BET}$ (m$^2$/g) | $V_p$ (cm$^3$/g) | $d_p$ (nm) |
|---|---|---|---|
| PD-silica | 294 | 1.04 | 10.1 |
| PEI20-L | 136 | 0.52 | 11.8 |
| PEI35-L | 129 | 0.47 | 11.6 |
| PEI50-L | 51 | 0.23 | 11.0 |
| TEPA35-L | 123 | 0.50 | 11.8 |
| TEPA60-L | 93 | 0.20 | 11.6 |
| TEPA70-L | 24 | 0.10 | 11.3 |

Figure 5:
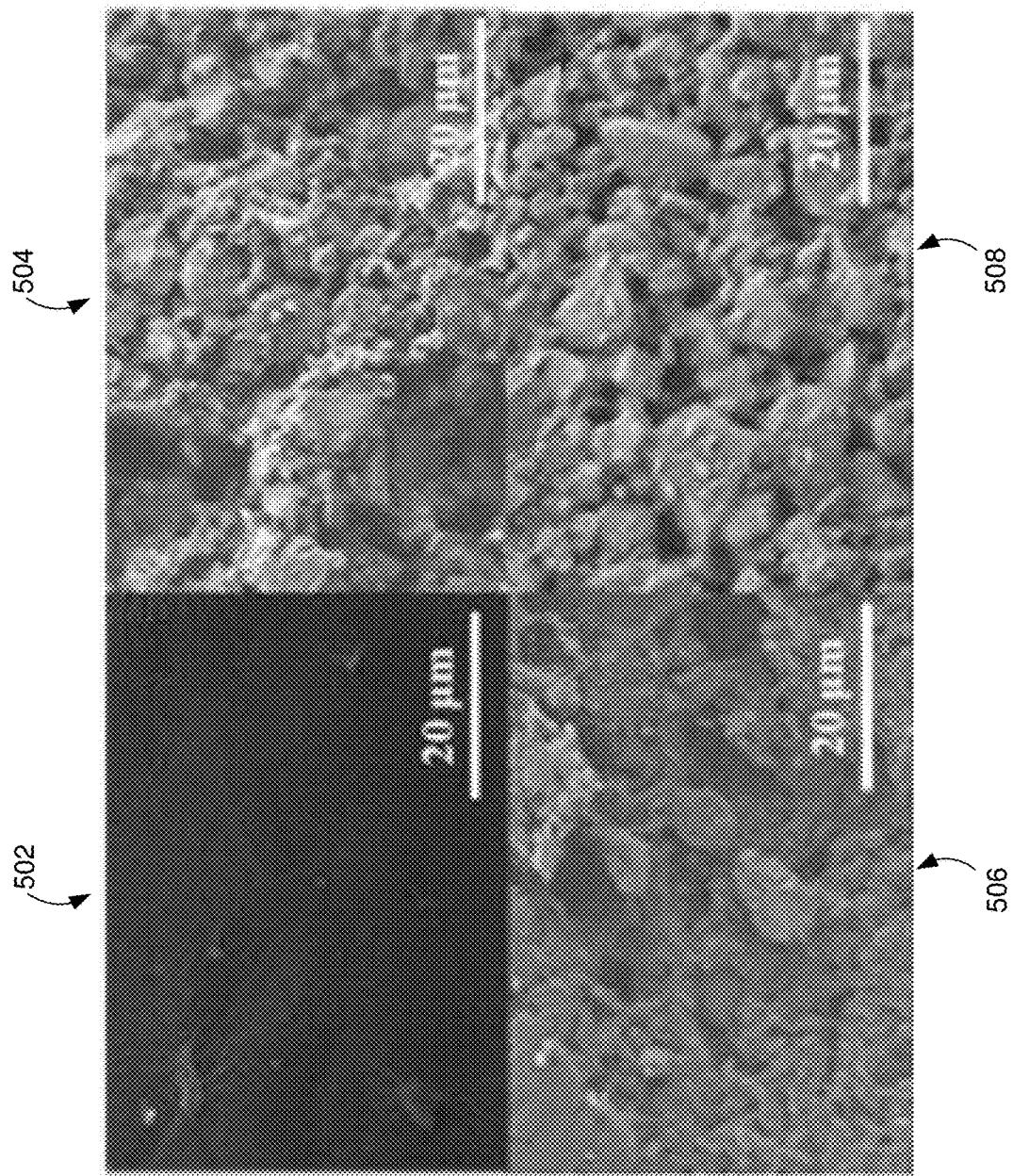
FIG. 5 is an SEM image of bare latex and SEM images of example coating compositions applied to a surface, in accordance with aspects hereof.

The morphology of the bare latex and aminosilica (TEPA-based) incorporated latex samples are illustrated in FIG. 5. To obtain these SEM (scanning electron micrograph) images, the paints were gently applied to the glass sheet and after the appropriate drying time, the thin film was carefully removed. Whereas the bare latex displayed a smooth surface (FIG. 5, panel 502), the rough surfaces were observed after addition of the pigments (FIG. 5, panels 504, 506, and 508). On the increase of loading of aminosilica particles, the granular particles through the periphery of the latex were noticeable. This was due to a high PVC level, which covered the latex film, as opposed to low PVC paints, which have larger portions of exposed latex and do not yield a tight packing of the paint molecules. These images confirm the successful incorporation of the aminopolymers into the latex coating. It should be noted that a similar morphology was observed for the PE-based coatings.

Figure 6A:
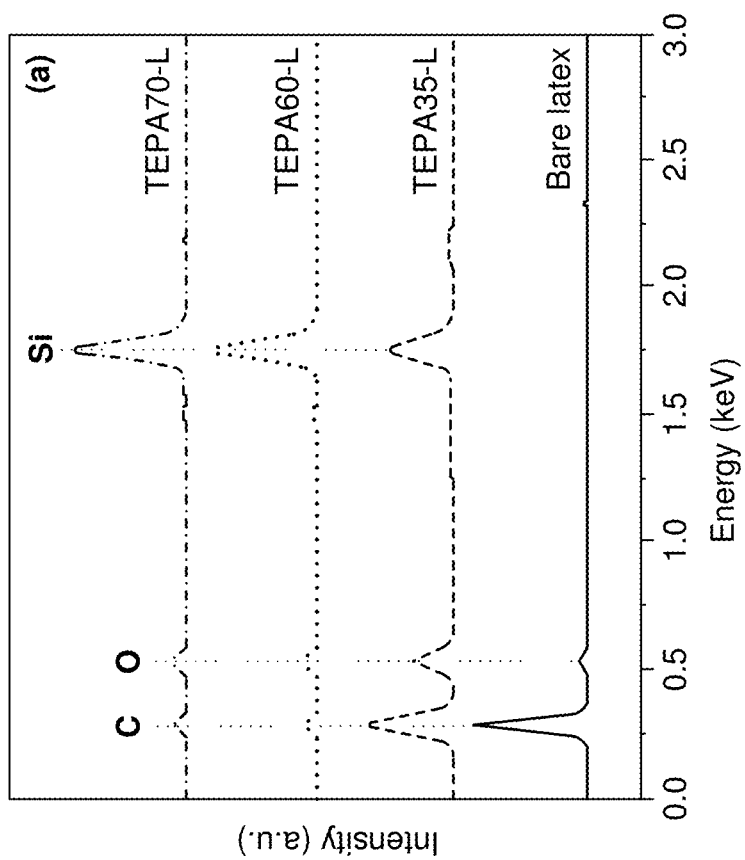
FIGS. 6A and 6B are EDS spectra of various example coating compositions, in accordance with aspects hereof.
Figure 6B:
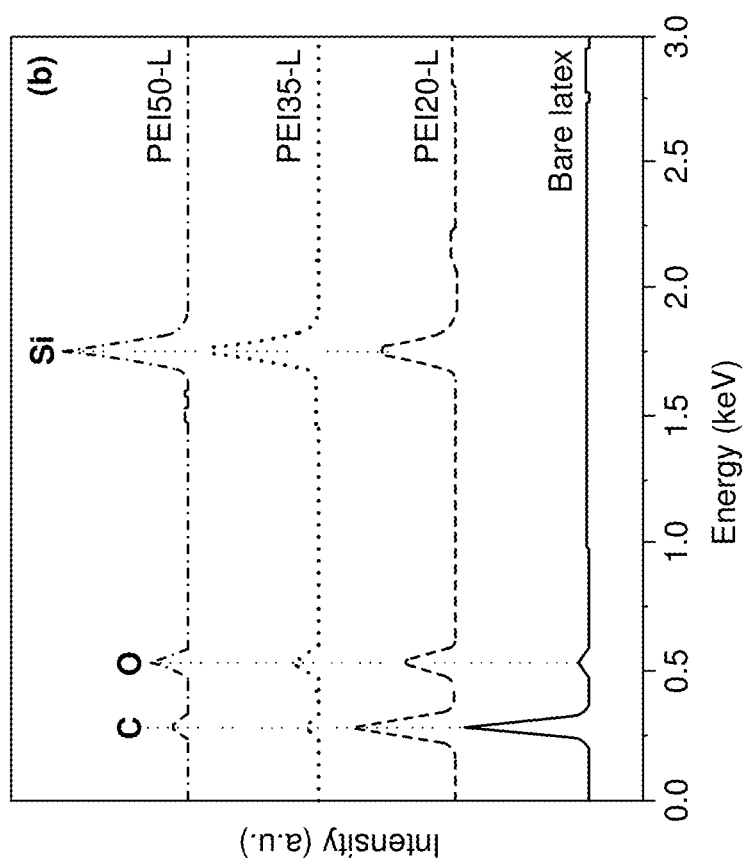

The corresponding EDS (Energy-dispersive X-ray spectroscopy) spectra of TEPA- and PEI-based paints are presented in FIGS. 6A and 6B. When comparing the bare latex material to the paint formulated, a sharp rise in Si spectrum detection was observed and the peak intensity increased with higher loadings as a result of subsequent lower content in other elements detected.

Figure 7:
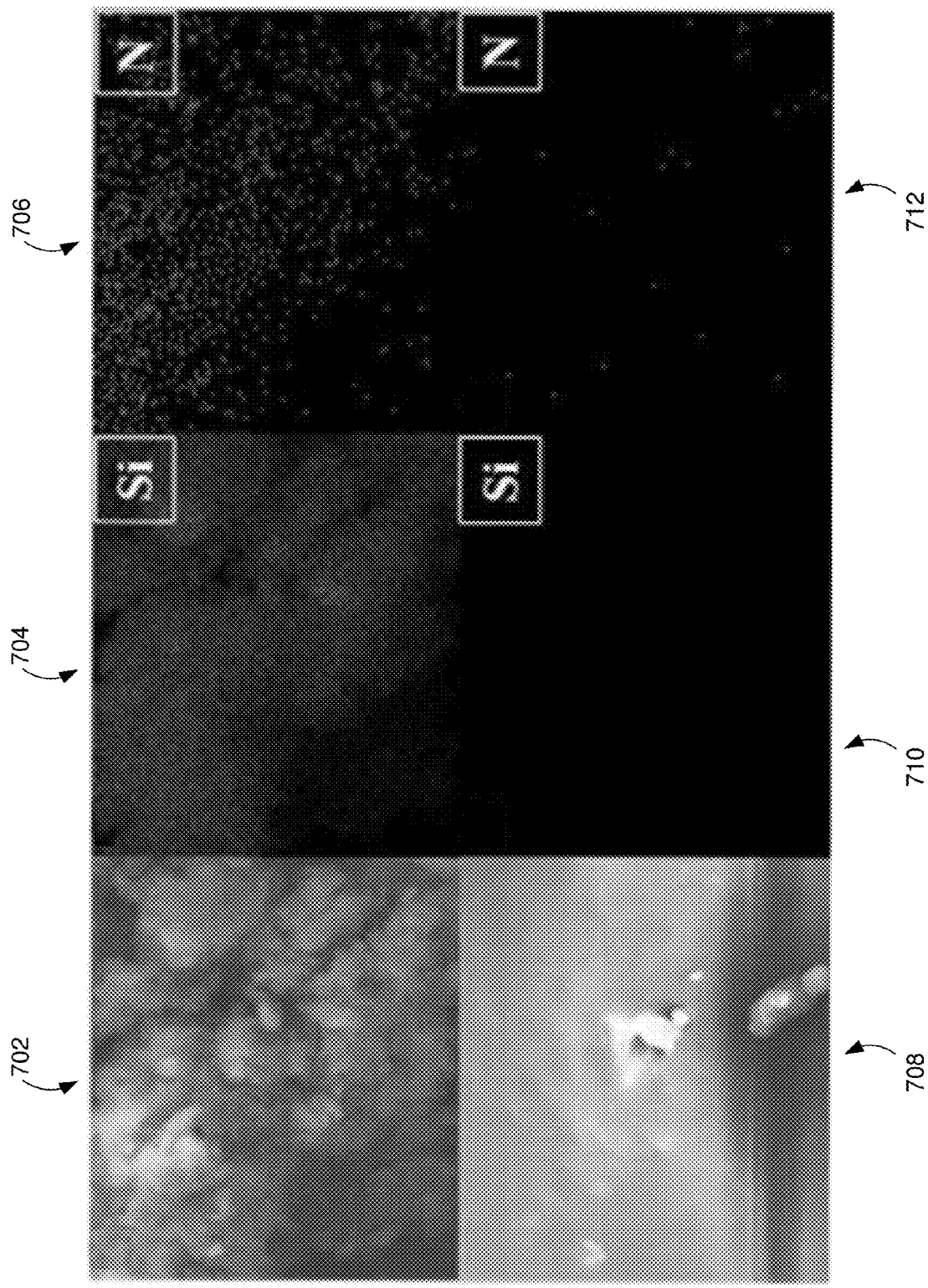
FIG. 7 depicts elemental mapping for various example coating compositions, in accordance with aspects hereof.

The dispersion of Si in the latex was confirmed by the elemental mapping, presented in FIG. 7, panel 704 for the case of TEPA70-L (FIG. 7, panels 702, 704, and 706 correspond to the elemental mapping experiment for TEPA 70-L, and panels 708, 710, and 712 correspond to the elemental mapping of bare latex). Also, the Si content was shown to be dispersed through the periphery of the latex for all other paints formulated. While nitrogen cannot be accurately determined using this technique due to limitations for low valance elements, from FIG. 7, panel 706, we observed a dispersion of N through the aminopolymer loaded paints in contrast to the bare latex through elemental mapping, illustrated by FIG. 7, panel 712, which showed very minor detections stemming from the additives used in the formulation.

Figure 8A:
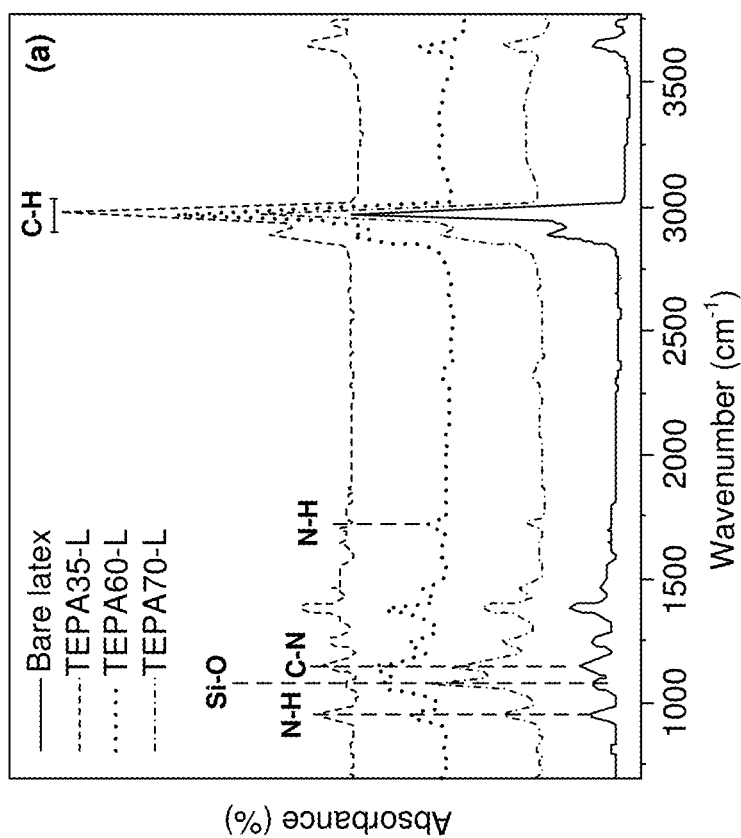
FIGS. 8A and 8B depict FTIR spectra for bare latex or various example coating compositions, in accordance with aspects hereof.
Figure 8B:
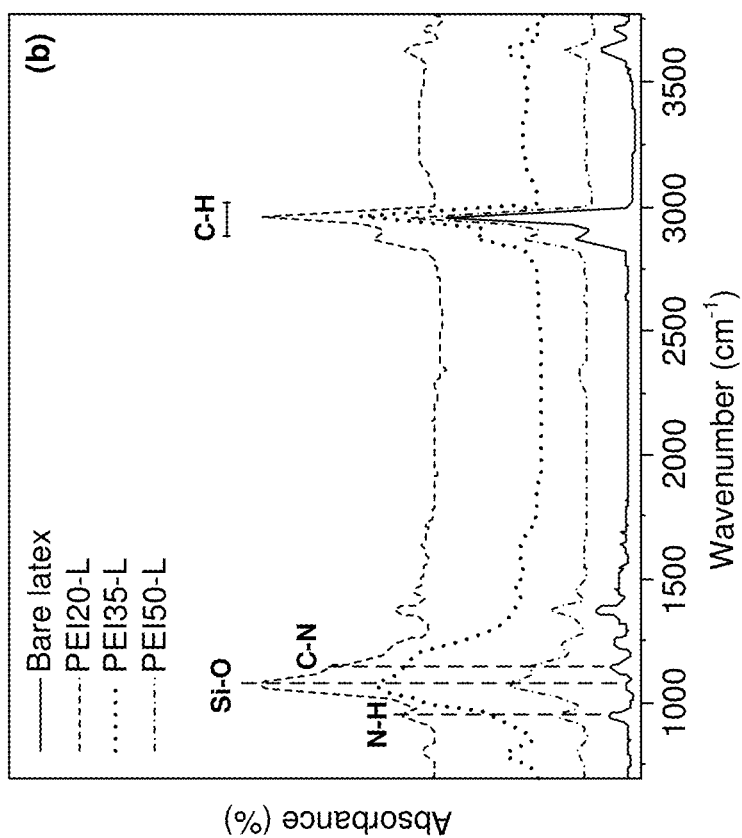

To further demonstrate the incorporation of aminosilica particles into the latex coating, FTIR spectra were collected and compared with that of bare latex for both TEPA- and PEI-based coatings, as shown in FIGS. 8A and 8B. Two prominent peaks were detected in the paints at 1080 $cm^{-1}$, which corresponded to Si—O stretching, while a small peak at approximately 800 $cm^{-1}$ was stemmed from Si—O—Si stretching vibration. This was shown to be much stronger in the case of the TEPA samples, as depicted in FIG. 8A. The peak in the 1300 $cm^{-1}$ range signifies the polyethylene portion of the material, which was detected in all materials, as polyethylene based-compounds can be found in the latex formulation. Furthermore, as evident from FIG. 8A, the intensity of the C—N bands increased with increased loading, indicating a higher amine concentration in the paints. The functionalization of the amine moieties onto the aminosilica materials can be illustrated by the secondary peaks obtained at around 1000-1200 $cm^{-1}$, which correspond to C—N stretching in aliphatic amines. This confirms that the PEI remains fairly undamaged after latex incorporation. Furthermore, as evident from FIG. 8B, the intensity of the C—N bands increased with increased loading, indicating a higher amine concentration in the paints. The higher loaded samples also show another band at around 1650 $cm^{-1}$, which is due to the symmetric N—H bending from primary amine groups. N—H vibrational mode was also detected at about 900 $cm^{-1}$, indicative of primary and secondary amine groups. These bands were not detected in the bare latex, and signifies the successful incorporation of the amine groups onto the paint. As the CPVC level of TEPA is much lower than that of PEI, a consequently lower intensity of Si related bonds was detected. Notably, the N—H wagging movements were also not detected. Minor bands were observed around 3700 $cm^{-1}$ which were observed due to the hydroxyl groups present in the support silica material. What was noticeable was the suppression of this band after the amine impregnation, when compared to the bare latex, which suggested the formation of amine-silanol complexes. This suppression is higher in TEPA samples when compared to PEI, which could also be the reason for a weaker C—N band detected earlier.

Figure 9A:
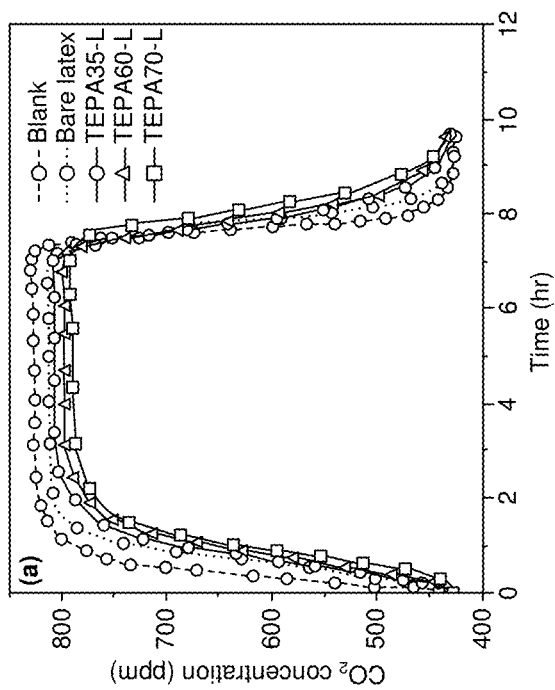
FIGS. 9A-9D depict $CO_2$ breakthrough results obtained from $CO_2$ Adsorption Chamber Tests on various coating compositions at 15% Relative Humidity (RH), in accordance with aspects hereof.
Figure 9B:
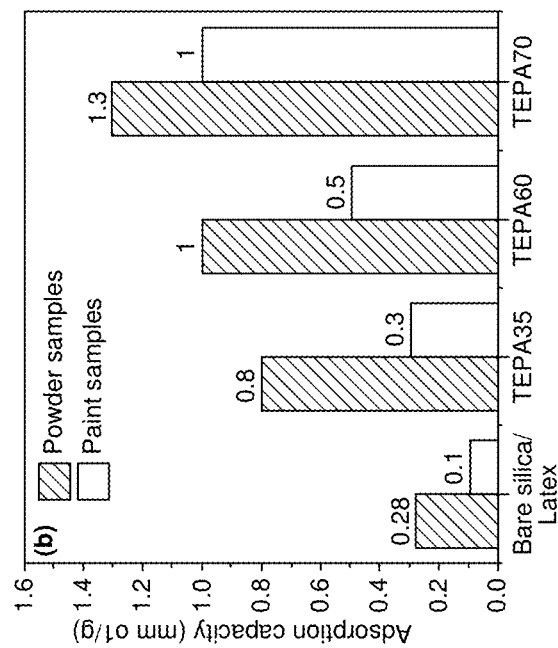
Figure 9C:
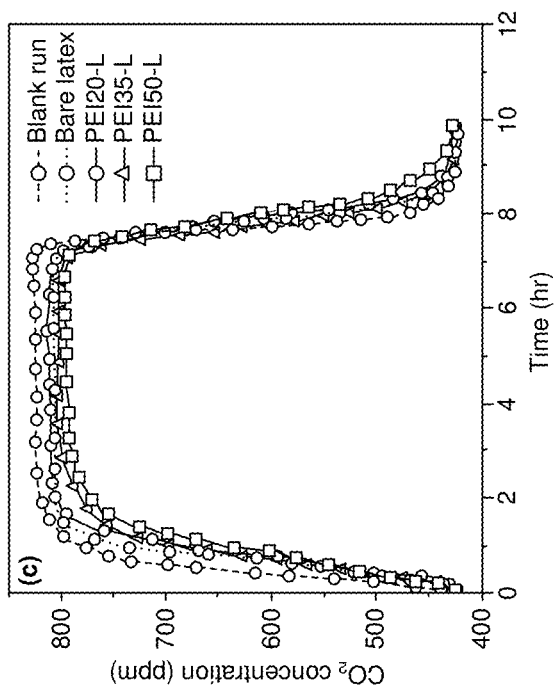

FIGS. 9A-9D illustrate the $CO_2$ breakthrough results obtained from the chamber tests using 800 ppm $CO_2$/air at 15% RH for all paints prepared. In a time frame of 10 h, compete saturation of the adsorption and desorption was observed for the coatings. The effectiveness of the amino-silica latex coatings in passively controlling $CO_2$ could be realized by the reduction in $CO_2$ level in chamber air compared to bare latex case, and also by gradual raise in $CO_2$ concentration as opposed to sharp increase in the case of bare latex (FIGS. 9A and 9C). For instance, while for empty chamber (blank run) the $CO_2$ concentration reached its maximum (~850 ppm) within 1 h, it took 4 h for chamber with TEPA70-L to reach its maxim value (~760 ppm). It should be noted that the tail end of the figures depicts the desorption of the $CO_2$. It is inferred that the physically adsorbed species appreciably desorbs in the assigned time frame (3 h). While the desorption process is fairly quick (e.g. 2 h for TEPA70-L), the adsorption process was much longer (e.g. 4 h for TEPA70-L). This delay in desorption could be due to strong adsorption efficiency of the amines to $CO_2$ which would explain why this phenomenon is observed in both powder and paint samples.

Figure 9D:
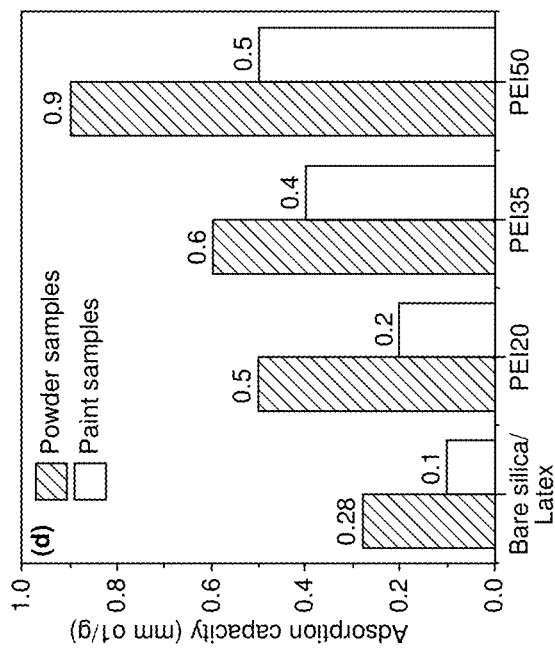

FIGS. 9B and 9D represent the calculated adsorption capacities for TEPA and PEI-based materials, respectively. Further investigation of these chamber test results revealed that silica-TEPA-latex materials were shown to have a much better $CO_2$ capture efficiency when compared to silica-TEPA latex. The most efficient capture was achieved by TEPA70-L at 1 mmol/g. Similarly, PEI50-L was observed to have the best adsorption capacity at 0.5 mmol/g among silica-PEI samples. However, unlike their powder counterparts, the difference in capture efficiencies between the PEI50-L and TEPA70-L was close to 50%. To test the effects of the support and binder, bare silica and bare latex were also tested, and showed minimal capture capacities.

Figure 10A:
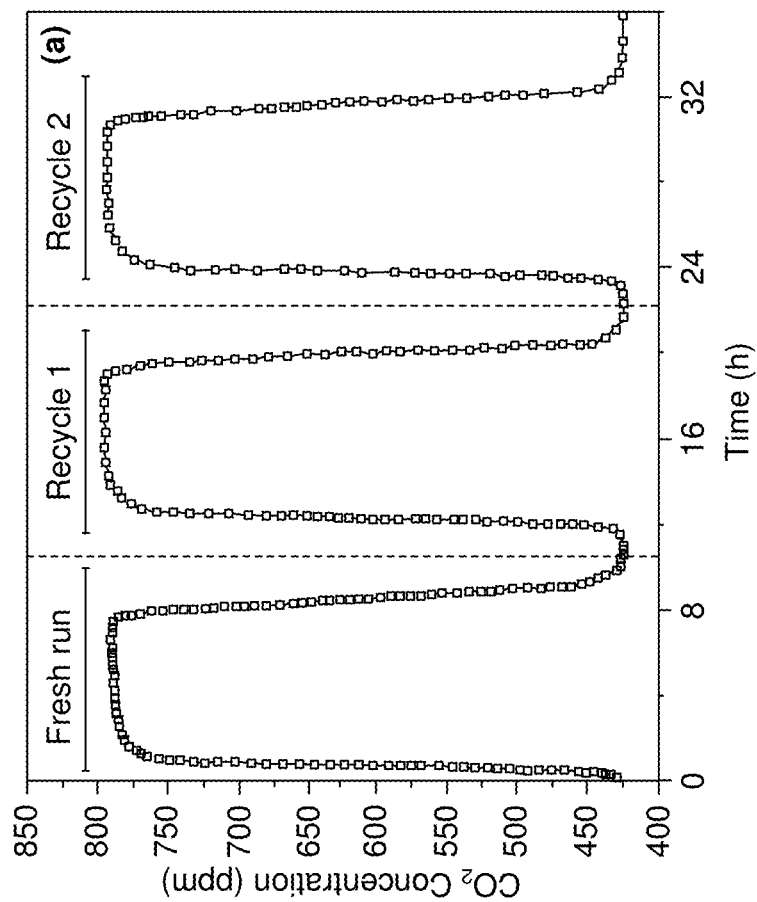
FIGS. 10A and 10B depict $CO_2$ concentration capacity for various coating composition in adsorption-desorption cycles, in accordance with aspects hereof.
Figure 10B:
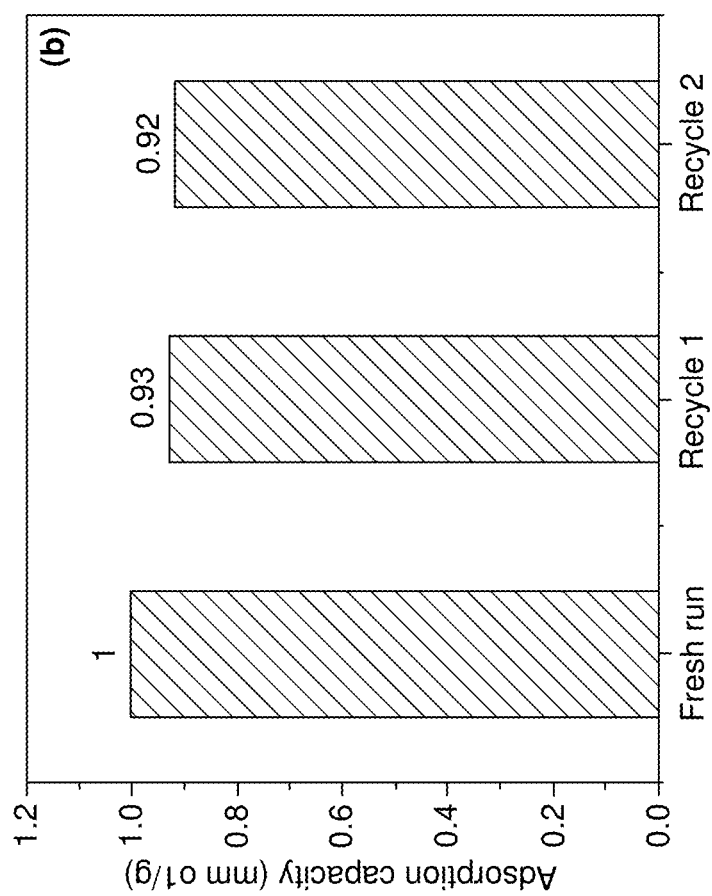
Figure 11A:
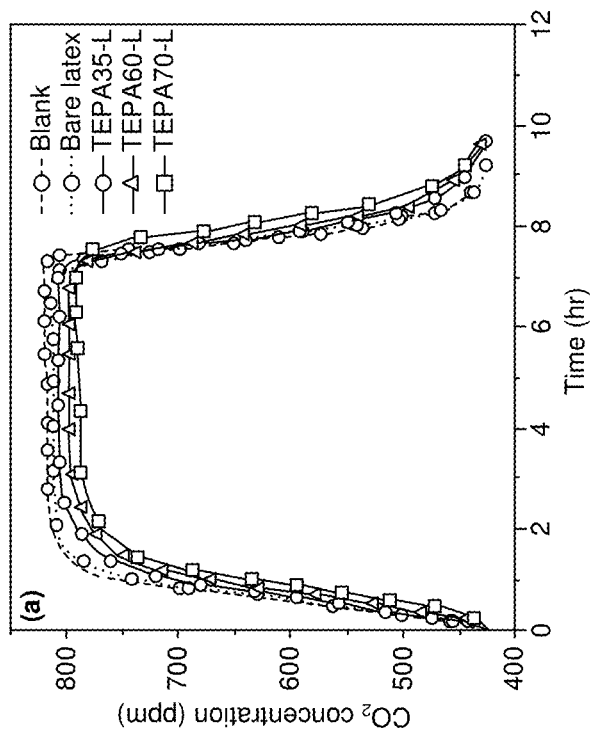
FIGS. 11A-11D depict $CO_2$ breakthrough results obtained from $CO_2$ Adsorption Chamber Tests on various coating compositions at 50% RH, in accordance with aspects hereof.
Figure 11B:
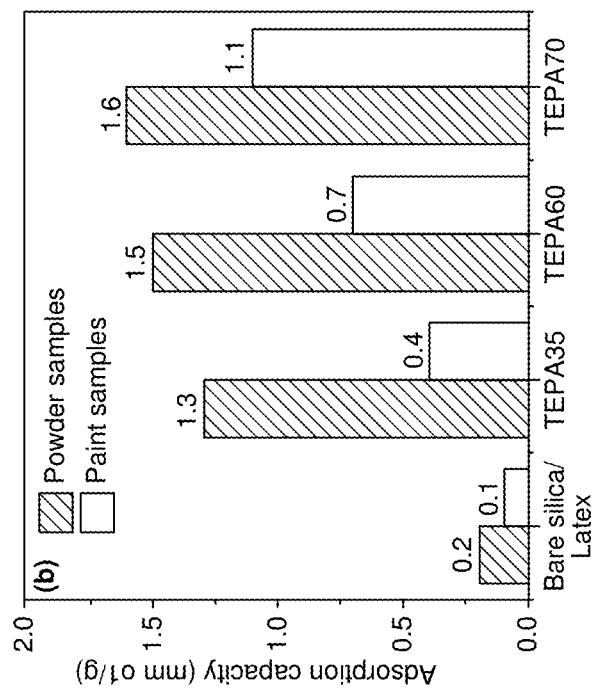
Figure 11C:
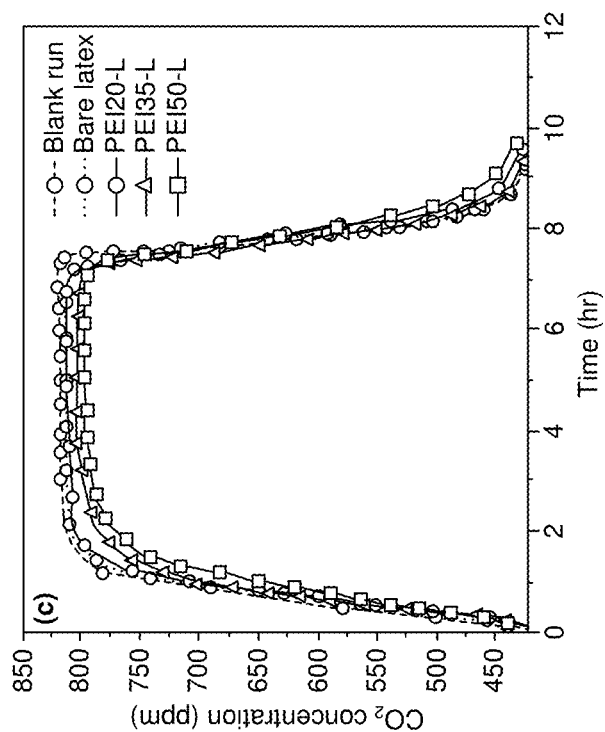
Figure 11D:
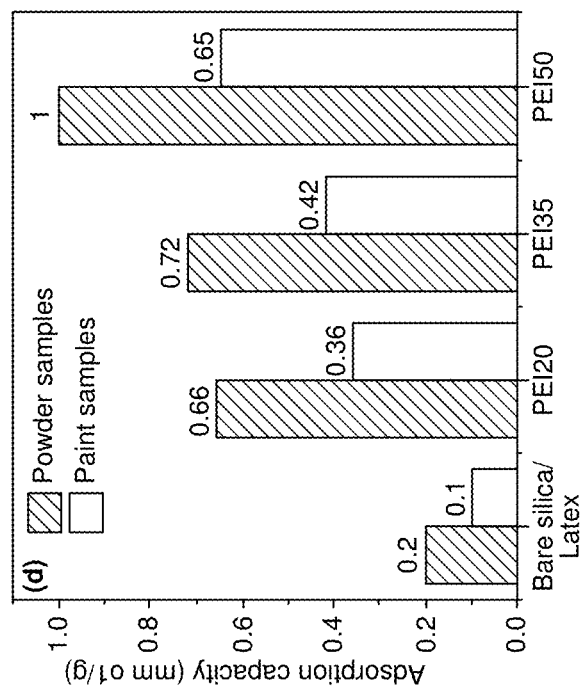
Figure 12A:
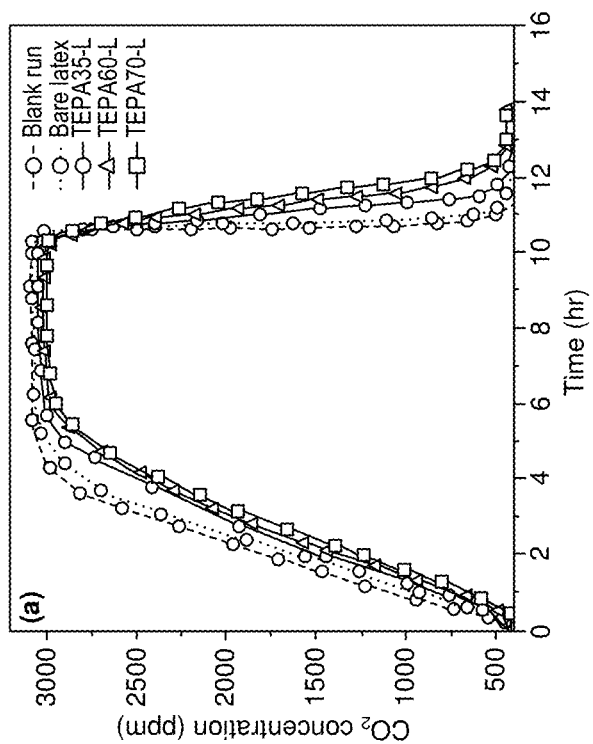
FIGS. 12A-12D depict $CO_2$ breakthrough results obtained from $CO_2$ Adsorption Chamber Tests on various coating compositions at 15% RH and 50% RH, in accordance with aspects hereof.
Figure 12B:
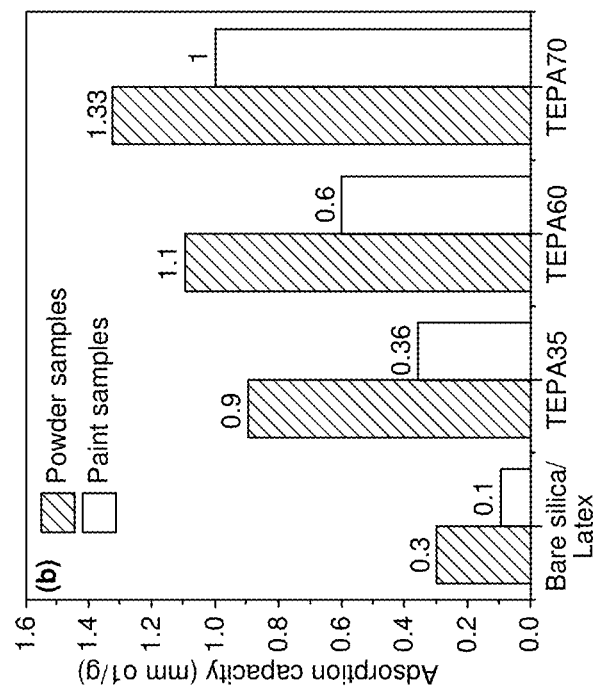
Figure 12C:
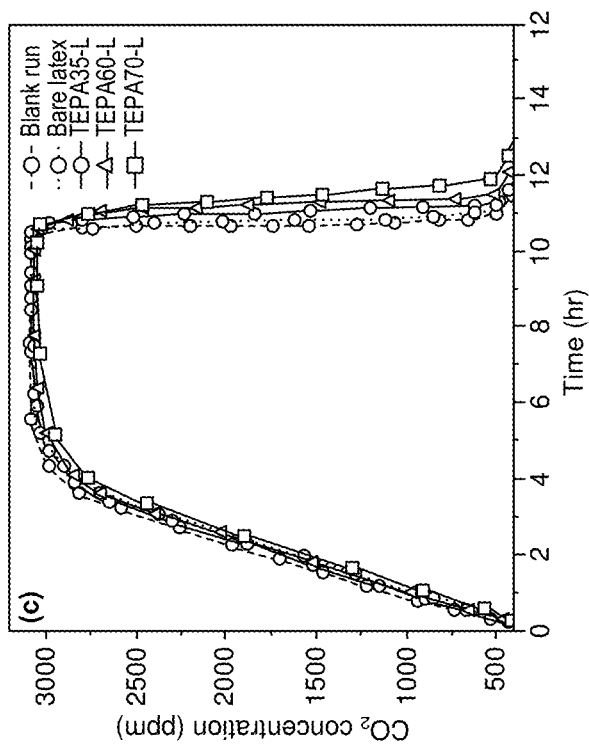
Figure 12D:
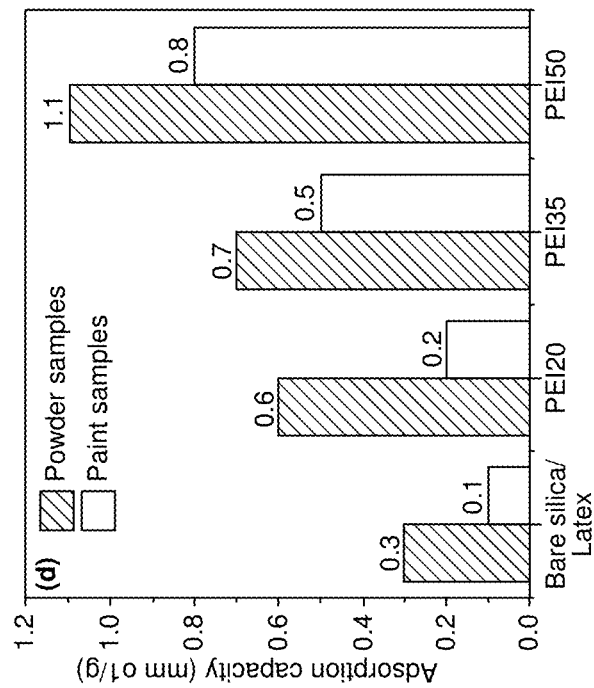

To determine any changes to the stability of the amino-silica-latexes, three adsorption-desorption cycles were performed to investigate their capacity over consecutive cycles. FIGS. 10A and 10B illustrate cyclic tests performed on TEPA70-L at 800 ppm and 15% RH. Fractional loss in capacity during cyclic runs after purging with the air stream during the desorption process suggests that physisorption is more dominant than chemisorption during this phenomenon. A 7.5% reduction in capacity was detected from the fresh run to the first cycle, with subsequent cycle displaying a very low reduction in uptake, revealing the reusability of the prepared paints. These tests prove that aminosilica based paints at high PVC levels are promising candidates for passive control of indoor air $CO_2$ in commercial buildings, in aspects.

Due to the role of relative humidity in the indoor environment, the materials were tested at elevated relative humidity levels (RH=50%), which is higher than ambient conditions, as mentioned earlier. As demonstrated in FIGS. 11A-11D, the RH level had a negative effect on the adsorption capacity of bare silica/latex, and caused a decrease in $CO_2$ uptake, whereas for amine-based latex adsorbents, the capture capacity enhanced at higher RH level. For example, under the same $CO_2$ concentration, an enhancement of up to 30% was observed at 50% RH compared to 15% RH (FIGS. 9A-9D). It is inferred that the increase in humidity level facilitates a greater amine capture potential Notably, the desorption time and rate were increased when compared to lower humidity level which is attributed to the higher $CO_2$ capture capacity of amine-based materials at humid conditions. The lower desorption rates can be particularly identified in the powder samples, where the powder samples were shown to have incomplete desorption in the time frame provided.

Investigation of the $CO_2$ chamber results revealed the drop in capacity of the aminosilica materials after incorporation into the latex coatings. Such behavior could be correlated to the reduction in amine sites as a results of partial pore blockage or amine leaching during paint preparation. Increase in amine loading generally resulted in less reduction in capacities for both classes of materials, with the exception of TEPA60 and TEPA70. The largest reduction was observed for the lowest loaded samples, which could be due to the leaching of amine groups during the paint processing. Higher concentration of amine groups resulted in more retention. This was additionally observed in Table 1, where higher loading percentages resulted in higher amine retention.

In the next step, the effect of $CO_2$ level in indoor air under two humidity levels (15 and 50%) was examined by conducting chamber tests at a $CO_2$ inlet concentration of 3000 ppm and the results are displayed in FIGS. 12A-12D. Larger quantities of $CO_2$ resulted in larger saturation times, which increased the total duration of the cycle to 13 h. The results indicated that upon increase in $CO_2$ concentration from 800 to 3000 ppm, the $CO_2$ uptake over coatings increased, in agreement with the powder counterparts. The highest adsorption capacity among the powder samples was obtained from TEPA70, similar to the previous case, at 1.6 mmol/g. The loss in $CO_2$ uptake was found to be more pronounced for TEPA35, as was the case for 800 ppm runs, primarily due to amine leaching (from 20 to 17%, see Table 1). The loss in capacity with the incorporation of the powder into the latex for TEPA70 was found to be around 20%. This was similar to the drop in capacity experienced in the 800 ppm runs. All adsorbents and paints showed complete desorption within the time frame selected for the experiment. Higher amine loaded samples, however, showed slower rates of desorption when compared to lower loaded samples. TEPA based samples also showed slower rates of desorption when compared to PEI materials, which was to be expected due to the superior adsorption of the TEPA adsorbents and paints, as inferred before.

Additionally, the effect of indoor air humidity was investigated by performing the chamber tests with an inlet concentration of 3000 ppm of $CO_2$ with elevated relative humidity levels, at 50%. The same positive effect trend on $CO_2$ uptake at higher RH levels was observed in these tests. These results indicated that at higher concentrations, the amino silica-incorporated coatings could potentially be efficient in situations with higher consistent $CO_2$ exposure such as crowded enclosed spaces with high levels of humidity. The 3000 ppm takes about 6-7 h to reach saturation, which in contrast to 3 h in the case of 800 ppm at the same humidity level.

The data from this Example 2 show, inter alia, TEPA and PEI were successfully impregnated onto a mesoporous silica support and were consequently incorporated with a polyacrylic based latex at CPVC level, to obtain a paint formula with high surface qualities and $CO_2$ adsorption properties. A more efficient paint tested was found to be TEPA70-L with an adsorption capacity of 1.0 mmol/g at 800 ppm of $CO_2$ and 15% RH. The effects of relative humidity and $CO_2$ concentration on control of $CO_2$ concentration in indoor air were evaluated and the results obtained indicated the enhancement in performance of latex coatings at elevated humidity and $CO_2$ levels. PEI based paints were shown to have a high reduction in capacity after latex incorporation. High shear forces used to prepare the paints could be responsible for the leaching of the amine groups, and thereby yielding a lesser uptake capacity. Higher amine loadings and larger volumes with lower shear rates could potentially solve this issue. Cyclic runs were also carried out to determine the reusability of these paints, and negligible reduction in capacities were detected. This suggests that these paints can be used repeatedly without a large efficiency loss. Further, this data from the Examples shows that the incorporation of aminosilica materials into paint formulations can be used as a passive $CO_2$ control technology, greatly reducing energy demands in frequented, enclosed spaces, such as office rooms or school classrooms.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A coating composition, comprising:
   an aminosilica absorbent, wherein the aminosilica adsorbent comprises a mesoporous silica support and one or more aminopolymers, and
   a latex mixture comprises a polymeric binder, wherein the polymeric binder is present in the coating composition in an amount of 10 wt. % to 60 wt. %,
   wherein the coating composition exhibits an adsorption capacity of from 0.2 mmol/g at 800 ppm of $CO_2$ and 15% relative humidity to 1.5 mmol/g at 800 ppm of $CO_2$, as determined according to the $CO_2$ Adsorption Chamber Test; and the coating composition, in a dry state, exhibits an aminosilica content of from 40 to 85 wt %.

2. The coating composition according to claim 1, wherein the one or more aminopolymers comprises tetraethylenepentaamine (TEPA), polyethylene imine (PEI), or a combination thereof.

3. The coating composition according to claim 1, wherein the coating composition, in a dry state, exhibits an amine content of from 5 to 60 wt. %.

4. The coating composition according to claim 1, wherein the coating composition, in a dry state, exhibits a latex content of from 15 to 60 wt. %.

5. The coating composition according to claim 1, wherein the latex mixture further comprises a dispersant, water, propylene glycol, a defoamer, a thickener, a film former, or a combination thereof.

6. The coating composition according to claim 1, wherein the polymeric binder exhibits a glass transition temperature of about 20° C. or below.

7. A coating composition, comprising:
an aminosilica adsorbent, wherein the aminosilica adsorbent comprises a mesoporous silica support and one or more aminopolymers,
wherein the coating composition exhibits an adsorption capacity of from 0.2 mmol/g at 800 ppm of $CO_2$ and 15% relative humidity to 1.5 mmol/g at 800 ppm of $CO_2$, as determined according to the $CO_2$ Adsorption Chamber Test; and
a latex mixture, the latex mixture comprising one or more polymeric binders, wherein the aminosilica adsorbent is present at a volume that is within 20% of a volume of the one or more polymeric binders, wherein the one or more polymeric binders comprises one or more polyacrylic-based binders and the one or more polyacrylic-based binders is present in the coating composition in an amount of from 10 wt % to 60 wt. %.

8. The coating composition according to claim 7, wherein the one or more aminopolymers comprises tetraethylenepentaamine (TEPA), polyethylene imine (PEI), or a combination thereof.

9. The coating composition according to claim 7, wherein the latex mixture further comprises a dispersant, water, propylene glycol, a defoamer, a thickener, a film former, or a combination thereof.

* * * * *